(12) United States Patent
Qvist (10) Patent No.: US 11,220,997 B2
(45) Date of Patent: Jan. 11, 2022

(54) ADAPTIVE NOISE CONTROL FOR WIND TURBINE

(71) Applicant: VESTAS WIND SYSTEMS A/S, Aarhus N (DK)

(72) Inventor: Martin Qvist, Højbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 170 days.

(21) Appl. No.: 16/468,192

(22) PCT Filed: Nov. 24, 2017

(86) PCT No.: PCT/DK2017/050391
§ 371 (c)(1),
(2) Date: Jun. 10, 2019

(87) PCT Pub. No.: WO2018/103801
PCT Pub. Date: Jun. 14, 2018

(65) Prior Publication Data
US 2019/0331093 A1 Oct. 31, 2019

(30) Foreign Application Priority Data

Dec. 9, 2016 (DK) .............................. PA201670979

(51) Int. Cl.
*F03D 7/02* (2006.01)
*F03D 17/00* (2016.01)
(Continued)

(52) U.S. Cl.
CPC ......... *F03D 7/0296* (2013.01); *F03D 7/0224* (2013.01); *F03D 7/048* (2013.01);
(Continued)

(58) Field of Classification Search
CPC ....... F03D 7/0296; F03D 17/00; F03D 7/0224
(Continued)

(56) References Cited

U.S. PATENT DOCUMENTS

| 10,024,304 B2* | 7/2018 | Lee .......................... F03D 9/25 |
| 2007/0031237 A1* | 2/2007 | Bonnet .................. F03D 7/048 415/1 |

(Continued)

FOREIGN PATENT DOCUMENTS

| EP | 2216549 A2 | 8/2010 |
| WO | 2018103801 A1 | 6/2018 |

OTHER PUBLICATIONS

PCT Notification of Transmittal of the International Search Report and the Written Opinion of the International Searching Authority, or the Declaration for Application No. PCT/DK2017/050391 dated May 2, 2018.

(Continued)

*Primary Examiner* — Robert A Cassity
(74) *Attorney, Agent, or Firm* — Patterson + Sheridan, LLP (57) ABSTRACT

A control system for one or more wind turbines comprising an RF receiver used as a method for adaptively controlling the noise mode of operation of a wind turbine. Preferably, this involves multilateration to determine location of RF sources near wind turbindes of a wind turbine park. The RF receivers would detect nearby RF signals in multiple spectrums, in particular mobile telecommunication signals (GSM/UMTS), to identify and localize RF sources near to the wind turbine(s). This information is then be processed to identify which RF sources are likely to be linked to a real person near the wind turbine, and this can be used to adjust the noise mode of the wind turbine accordingly. Thereby maximizing energy production from the wind turbine in absence of nearby people, while keeping noise low when people are nearby.

16 Claims, 4 Drawing Sheets

(51) Int. Cl.
*F03D 7/04* (2006.01)
*H04W 64/00* (2009.01)

(52) U.S. Cl.
CPC .......... *F03D 17/00* (2016.05); *H04W 64/003* (2013.01); *F05B 2260/96* (2013.01); *F05B 2270/80* (2013.01)

(58) Field of Classification Search
USPC ........................................................ 700/280
See application file for complete search history.

(56) References Cited

U.S. PATENT DOCUMENTS

| | | | | |
|---|---|---|---|---|
| 2008/0271123 | A1* | 10/2008 | Ollis ...................... | G08C 17/02 726/4 |
| 2008/0274752 | A1 | 11/2008 | Houri | |
| 2009/0204265 | A1* | 8/2009 | Hackett .............. | G05B 19/4185 700/284 |
| 2010/0135798 | A1* | 6/2010 | Eggleston ............... | F03D 7/042 416/36 |
| 2010/0143117 | A1* | 6/2010 | Xiong ..................... | F03D 17/00 416/1 |
| 2012/0139254 | A1* | 6/2012 | Attia ....................... | F03D 13/20 290/55 |
| 2013/0154263 | A1 | 6/2013 | Attia | |
| 2014/0135998 | A1* | 5/2014 | Cao .......................... | F24F 11/30 700/278 |
| 2014/0213291 | A1 | 7/2014 | Soderlund et al. | |
| 2014/0248148 | A1* | 9/2014 | Abdallah .............. | F03D 7/0296 416/1 |
| 2015/0160673 | A1* | 6/2015 | Vasylyev ............. | H05B 47/105 700/295 |

OTHER PUBLICATIONS

Danish Patent and Trademark Office for Application No. PA 2016 70979 dated Aug. 23, 2017.

\* cited by examiner

ADAPTIVE NOISE CONTROL FOR WIND TURBINE

FIELD OF THE INVENTION

The invention relates to a method for controlling a wind turbine with respect to its mode of operation and its generation of external noise. Especially, the invention relates to controlling a wind turbine noise mode of operation in response to detection of nearby radio frequency signal sources.

BACKGROUND OF THE INVENTION

Wind turbines are subject to noise regulation in certain parts of the world, in particular in Europe, to guard people living near wind turbines against noise generated by the wind turbines. Depending on the type of area, the allowed external noise emission from wind turbines is governed by regulation. The purpose of the noise regulation is to minimize the disturbance that a wind turbine park would have to e.g. a nearby residential area. The regulation can be based on absolute or relative dBA limits, and can be different from daytime to nighttime, this is the case in some parts of Germany.

To handle this, a wind turbine can be controlled to operate in different noise modes, where the noise emission has been determined for each noise mode of operation. The appropriate noise mode of operation can then be set so as to comply with the noise regulation in a given area.

However, a wind turbine set to operate in a low noise mode of operation will generate less electric energy than its potential. Thus, wind turbines installed in areas with strict noise regulation will produce less electric energy than optimal.

SUMMARY OF THE INVENTION

It may be seen as an object of the present invention to provide a solution to the problem of guarding people living near wind turbines against noise from the wind turbines, and at the same time optimize electric energy generated by the wind turbines.

According to a first aspect, the present invention provides a control system for controlling a noise mode of operation of a wind turbine in a wind turbine park, the control system comprising a processor and being arranged for:
  receiving inputs from a plurality of radio frequency receivers located at positions in or near respective wind turbines in the wind turbine park,
  calculating a measure indicative of a location of a radio frequency source near a wind turbine of the wind turbine park in response to the inputs from the plurality of radio frequency receivers, and
  controlling the noise mode of operation of one or more wind turbines in the wind turbine park according to the measure indicative of a location of a radio frequency source.

The invention is based on the insight that passive radio frequency receivers can be used to estimate location of individuals near the wind turbines of a wind turbine park, and then adaptively controlling the noise mode of operation of wind turbines in response to the location and number of people near the wind turbine. The radio frequency receiver would detect nearby radio frequency (RF) signals in multiple spectrums, in particular mobile telecommunication signals (GSM/UMTS/LTE), to identify and localize radio sources near to the wind turbine. This information would then be processed such as to classify which radio sources are linked to real persons being in the vicinity to the wind turbine, which in turn would be used to adjust the noise mode of the wind turbine, in such a way as to maximize production while keeping noise low when people are near by.

Normally, the noise mode of operation of a wind turbine park is statically configured, depending on the noise regulation at the location of the wind turbine park. However, with the control system according to the invention, the noise mode of operation can be controlled dynamically, i.e. varying over time, and adaptively in response to the best estimate of persons near the wind turbine park, wherein this estimate is based on detection and location of nearby RF sources. This presents the opportunity to achieve a good compromise between a maximized energy production from wind turbine park, while minimizing noise disturbance.

Smart phones are widely adopted in the western world, e.g. 72% in 2015 in the US. Combined with the fact that such devices transmit RF signals frequently, even at times where the user does not actively perform a telephone call or internet search etc., there is a good correspondence between RF signal activity and the presence of people near a wind turbine park. If no active RF transmission in the relevant mobile telecommunication RF bands is detected over a period of time from a certain area, one may assume that there are no people in the area. On the contrary, if RF transmission in the relevant mobile telecommunication RF bands is detected and determined to be located in the area, preferably via multilateration, and it is further found that the RF source is stationary or moving at a moderate speed, it is most probably due to a person being present in the area. With the assumption that there are persons present in the area, noise from the wind turbine(s) nearby should preferably be reduced. On the other hand, the mode of operation of the wind park can be optimized for electric energy production, if it can be assumed that no person to be disturbed by noise from the wind turbines. Therefore, location of RF sources provides valuable information for use in determining a relevant scheme for controlling noise mode of operation of one or more wind turbines in a wind turbine park.

It is known in the art of telecommunication, that it is possible to identify one specific mobile device RF source and even track its movements, without the need to access content represented in the RF signal, e.g. phone conversation speech data or other data. Thus, the control system can be active without compromising confidentiality of RF communication near the wind turbine park.

The day and night noise limits present in certain countries can be seen as a crude way of adapting the noise mode to when people are actually present in an area near a noise source, and the present invention can be seen as a potentially more accurate method of achieving the same object. The invention could also be used in countries with no noise regulation, to improve the public perception of wind turbines and to have them seamlessly and non-intrusively integrated into society.

By 'near a windturbine' in relation to an RF source is understood a distance relevant for a person to be disturbed by from the wind turbine, if located within this distance from the wind turbine. This distance will depend on the circumstances, but in order to decrease processing demands, only RF sources within a certain distance limit are relevant to track, e.g. with a limit of such as 5 km to the nearest wind turbine, depending on the size of wind turbine(s) and the surrounding area.

In the following, preferred embodiments and features of the invention will be described.

Especially, the RF receivers may comprise Software Defined Radio (SDR) receivers. Such SDR receivers are programmable and thus rather easy to setup for listening for specific RF signals, e.g. specific frequency bands. Preferably, SDR receivers are installed inside a plurality of wind turbines, e.g. located in the nacelle, of selected wind turbines in a wind turbine park. Of course the SDR devices may comprise transmission capabilities as well if preferred, however to perform the invention, passive receivers can be used.

It is to be understood that other types of RF receivers could be used, e.g. receivers with dedicated hardware for a specific application and e.g. frequency band. However, the flexibility of SDR receivers is advantageous, since one common SDR receiver can be used in wind turbines to be installed throughout the world, since the SDR receiver function can be easily adapted for tracking of various mobile communication standards depending on the country, as well as other RF sources of relevance to noise optimization.

Preferably, the system is arranged to calculate a measure indicative of a location of a plurality of single radio frequency sources within a predefined area around at least one wind turbine of the wind turbine park in response to the inputs from the plurality of RF receivers. Especially, the system may be arranged for 1) estimating a number of persons within the predefined area according to the measure indicative of locations of a plurality of single radio frequency sources, and 2) controlling the noise mode of operation of one or more wind turbines in the wind turbine park in response to the estimated number of persons. This allows a dynamic change of noise mode of operation adaptively in response to whether there are people near the wind turbines. Thus, if no persons are estimated to be near the wind turbines, a noise mode of operation with a high noise level can be accepted, while a more silent noise mode of operation can be selected if persons are near the wind turbines. Specifically, an area around a wind turbine in the wind turbine park may be divided into a plurality of different zones, and wherein a noise mode of operation of the wind turbine is controlled in response to an observed number of radio frequency sources located in each of the plurality of different zones. These zones can be part of a scheme for selection of noise mode of operation, depending on estimated number of persons in the zones. Such scheme can be either complicated or rather simple, depending on what is preferred, and may also include considerations of other factors that may affect the propogation of noise, e.g. wind speed and direction. The scheme can be selected to represent a choice tilted towards a silent operation or tilted towards a energy production operation or it can be a compromise therebetween. Since implemented in software, it can easily be adapted to local regulations or demands.

Preferably, the system is arranged to determine a location of a radio frequency source by performing a multilateration calculation in response to inputs from at least three RF receivers, preferably comprising at least three RF receivers arranged in respective wind turbines of the wind turbine park. Such multilateration of RF sources is known in the art and comprising a calculation of a detected RF signal by at least three RF receivers at respective known locations. In preferred embodiments, at least three wind turbines in a wind turbine park are equipped with RF receivers, and these RF receivers are connected via a wired or wireless network, e.g. via an operating module, so as to allow multilateration calculations. E.g. the wired or wireless network existing in a wind turbine for interconnecting the wind turbines with a park server can be used for this purpose. Therefore, in preferred embodiments, the control system can be at least partly implemented on a wind park server arranged to control the wind turbine park, e.g. a Supervisory Control And Data Acquisition (SCADA) server. Especially, the wind park server may be connected to at least three radio frequency receivers via a wired or wireless network, so as to allow comparison of the arrival times of a radio frequency signal received from one source location via the at least three RF receivers.

Preferably, the system is arranged to perform a source classification of a single radio frequency source. Most preferably, this is done so as to classify an RF source as indicative or not of the presence of a person. This can be done using a variety of parameters to monitor for a single RF source. Especially, the source classification may comprise tracking a location of the single radio frequency source over time, so as to allow classification of the single radio frequency source as a fixed or a semi-fixed source. Specifically, the source classification may comprise estimating a velocity of the single radio frequency source. Fixed RF sources (fixed over a long time period over a preselected time threshold) may be e.g. a bus stop RF transmitter, and should be disregarded in any estimation of persons. Fast moving RF sources could likewise be disregarded, since a person e.g. in a car moving at high speed would not be sensitive to wind turbine noise. The source classification may involve collection of relevant Geographic Information System data.

In a special case, a moving RF source located above the wind turbines can be assumed to be an aircraft, and in such case, a high noise mode of operation of the wind turbine(s) may be activated, since during fly over, noise from the aircraft will totally dominate over wind turbine noise.

The system may be arranged to individually control the noise mode of operation of a plurality of wind turbines in the wind turbine park in response to the measure indicative of a location of a radio frequency source. Hereby, it is possible to allow more noise emissions from wind turbines at locations far away from the nearest persons, while the wind turbine near persons can be set to a low noise mode of operation.

Especially, the noise mode of operation of the one or more wind turbines may be controlled by selecting between a number of predefined noise modes of operation in response to the measure indicative of a location of a radio frequency source. This can be done for the entire wind turbine park, or individually for each of the wind turbines in the wind turbine park. Specifically, the noise mode of operation can comprise controlling one or more operating parameters of the wind turbine, e.g. blade pitch which can be used to control rotor speed.

The calculation of a measure indicative of the location of an RF source may be performed within a limited, predefined radio frequency band, especially one or more of: the GSM band, the UMTS, the DCMA2000 band, and the LTE band. Further, the calculation comprises identifying the radio frequency channel access methods involving at least one of: Time division multiple access (TDMA) and Frequency division multiple access (FDMA), or both of TDMA and FDMA. Especially, the calculation is performed for a preselected plurality of telecommunication standards, channels and channel access methods. For each of said telecommunication standards or channels, a capturing frame length, e.g. 100 ms, is preferably selected for incoming radio frequency signals. The calculation of a measure indicative of a location of a radio frequency source can then be performed in response to captured radio frequency signals of the selected capturing frame length. Hereby, it is possible to screen only for relevant types of mobile phones, since it may be preferred to only detect location of RF sources which can be assumed to represent a person. It is to be understood, that the system is preferably suited for detecting RF sources communicating according to any telecommunication standards, e.g. a future 5G standard and any other future standard for mobile telecommunication.

It is preferred that a plurality of RF receivers, e.g. one in each of a plurality of wind turbines, are arranged to sample incoming RF signals, and to calculate a measure of their respective RF power. Preferably, the calculating a measure indicative of a location of an RF source is only performed in response to RF signals exceeding a preselected RF power threshold. Thereby, RF sources located far away can be disregarded from further analysis.

It may be preferred, that the system continuously updates the measure indicative of a location of a RF source, and adjusts the noise mode of operation of at least one of the wind turbines of the wind turbine park accordingly. Hereby, the noise from the can adapt to the location of nearby RF sources.

The system may be arranged to receive inputs from the plurality of RF receivers, to calculate measures indicative of locations of RF sources over a period of time, to calculate a statistical measure in response to the measures indicative of locations of RF sources over a period of time, and to control the noise mode of operation of one or more wind turbines in the wind turbine park according to the statistical measure. This allows the control system to adapt to what can be characterized as as a normal behavior of e.g. a population living near the wind turbine park, e.g. higher noise from the wind turbines can be accepted at periods where most people are not at home, while at periods where it is likely that people are at home, and therefore close to the wind turbines, a low noise mode of operation can be activated. Especially, the control system may be arranged 1) to calculate the statistical measure data over a period of a plurality of days, such as at least 10 days or more, 2) to determine different first and second noise modes of operation accordingly, and 3) to control the noise modes of operation of the at least one wind turbine of the wind park in response to the day time and night time noise modes of operation. In other embodiments, more than two different noise modes of operation corresponding to respective different noise reductions may be selected in response to locations of detected RF sources.

In some embodiment, it may be preferred to have a continuous scale of noise modes of operation selected according to a noise mode selection algorithm.

In some embodiments, the noise mode of operation is selected in response to a combination of location of detected RF sources and one or more additional parameters. Especially, such parameter may be wind direction, which will influence noise emission from the wind turbines depending on location of the receiver. Other parameters may be included in the selection of noise mode of operation, e.g. a schedule reflecting a specific noise regulation at the location of the wind turbine park.

In a second aspect, the present invention provides a wind turbine park comprising
    at least one wind turbine,
    a plurality of RF receivers, and
    a control system, according to the first aspect, for controlling a noise mode of operation of the at least one wind turbine in the wind turbine park.

In a third aspect, the present invention provides a method for controlling a noise mode of operation of a wind turbine in a wind turbine park, the method comprising:
    receiving inputs from a plurality of RF receivers located at positions in or near respective wind turbines in the wind turbine park,
    calculating a measure indicative of a location of a radio frequency source near a wind turbine of the wind turbine park in response to the inputs from the plurality of RF receivers, and
    controlling the noise mode of operation of one or more wind turbines in the wind turbine park according to the measure indicative of a location of a radio frequency source.

In a fourth aspect, the present invention provides a computer program product having instructions which, when executed, cause a computing device or a computing system comprising a processor to perform the method according to the third aspect. Especially, the computer program product may comprise as least parts to be executed on a processor in a server controlling mode of operation of a wind turbine park, and/or comprise parts to be executed on a processor in one or more wind turbines of the wind turbine park.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

A wind turbine, or wind turbine generator (WTG), has a tower, a rotor rotatable by action of the wind, typically with three rotor blades. The rotor is connected to a nacelle mounted on top of the tower. Via a shaft, e.g. also a gear box, the rotor drives an electric generator arranged inside the nacelle, thereby converting wind induced rotational energy of the rotor blades into electric power.

Such wind turbine will generate acoustic noise to the environment due to its various noise emitting elements, when operating. The noise from a wind turbine is mainly due to noise from the mechanical rotation of the drivetrain such as noise from the generator, bearings and gearbox and the wind noise from the blades passing through the air. Under normal operation the highest sound levels are emitted from the outer most half of the blades. The blade noise is highly dependent on the rotational speed of the rotor. The higher the rotational speed, the more noise the rotor produces. For both the mechanical and the wind noise it is possible to lower the noise by adopting a control strategy that lowers the rotational speed of the rotor.

Typically, the blades can be pitched in order to alter the aerodynamic properties of the blades, e.g. in order to maximize uptake of the wind energy and to ensure that the rotor blades are not subjected to too large loads when strong winds are blowing. The blades are pitched by a pitch system including actuators for pitching the blades dependent on a pitch request from a pitch control system. Further, other operating parameters can be changed to adapt the mode of operation of a wind turbine to various operating conditions, e.g. rotation speed and e.g. a complete halt of the wind turbine. Some of these parameters influence external noise emission from the wind turbine, and therefore various noise modes of operation can be defined in order to adapt the wind turbine to different noise demands, depending on where it is setup. However, in low noise mode of operation, the wind turbine will normally produce less electric energy than its potential.

Figure 1:
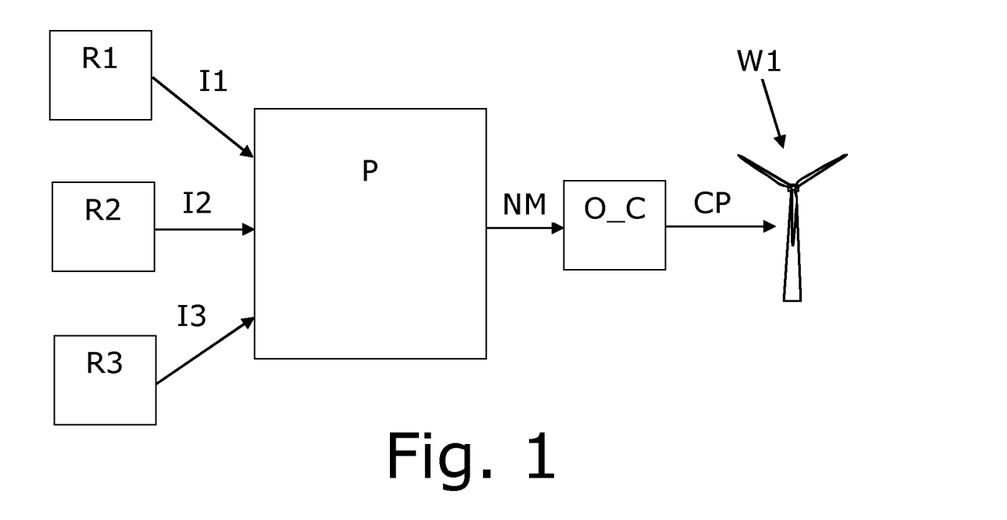
FIG. 1 shows a sketch of a control system embodiment.

FIG. 1 shows a control system embodiment for generating control parameters CP for controlling a wind turbine W1, so as to control a noise mode of operation of the wind turbine W1, e.g. a wind turbine forming part of a wind turbine park with a plurality of wind turbines. Three RF receivers R1, R2, R2 are located at different positions in or near wind turbines of the wind turbine park, e.g. SDR receivers in respective wind turbines of a wind turbine park. The RF receivers R1, R2, R2 generate respective inputs I1, I2, I3 to a processor system P.

The processor system P executes an algorithm arranged to determine locations of RF sources in response to the received inputs from the RF receivers R1, R2, R2. Preferably, the RF receivers transmit sampled RF signals represented in data I1, I2, I3 to the SCADA server or park operating module via a wired or wireless network to the processor system P. The processor P then performs a noise mode algorithm comprising a multilateration algorithm to determine location of the RF source which has sent the RF signals. Preferably, only RF signals relevant for mobile devices are processed, since mobile phones or smart phones can be assumed to be worn by a person, but other RF signals that may indicate the same could also be used. Thereby, it is interesting to determine distance to detected RF sources, and accordingly determine a noise mode NM of operation of one or more wind turbines W1 of a wind turbine park, so as to adapt the allowable wind turbine noise to the distance, and e.g. also number of persons, which can be affected by noise from the wind turbine W1. E.g. the noise mode of operation NM can be selected from a preset number of noise modes of operation, e.g. according to a preset schemes in response to location of RF source(s) assumed to represent persons. The information may be combined with other information about the local area, such as to identify RF sources originating from personally worn equipment, such as mobile phones, from stationary equipment in machinery, e.g. in connected cars. The information may also be used to identify if the person is in a quiet or noisy situation, for instance whether the person was driving in a car or not, based on their velocity which can be determined by tracking the RF source over time.

The processor system outputs noise mode data NM indicative of the determined noise mode of operation of the wind turbine W1, namely by providing the noise mode data NM to the operation controller O_C which accordingly translates the noise mode data NM to a set of operating parameters CP which are sent to the wind turbine W1, which operates accordingly. The processor system P may be implemented by the wind turbine park server, or it may in part be distributed in the wind turbines W1 of the park.

The noise mode of a wind turbine adjusts the power curve of the wind turbine, sacrificing energy yield for quieter operation. The noise mode could be set immediately, based on the distance of detected nearby personnel from the wind turbine, such that the noise would be progressively curtailed the nearer personnel are to the turbine. The obtained information may also be used to generate a daily vicinity profile, gauging how many people are typically near to the wind turbine on weekdays and weekends. This information could then be used to set a daily schedule, adjusting the noise mode at predefined time intervals during the day. The advantage of the former method would be that it maximizes the energy yield at any given time, but the disadvantage is that it adds further dynamic behavior to the wind turbine energy production. The advantage of the latter is that it is more stable, and can be reviewed and set predictably.

While the noise mode is adapted using this method, the RF receivers could still be active and detecting nearby personnel. This could be used to verify that the chosen mode of operating of the wind turbine can achieve a minimization of disturbance of the nearby personnel. This could be important in a regulatory setting, where the wind turbine park owner may have to prove that the wind turbine parks can comply with a given level of noise disturbance of the surrounding area.

Figure 2:
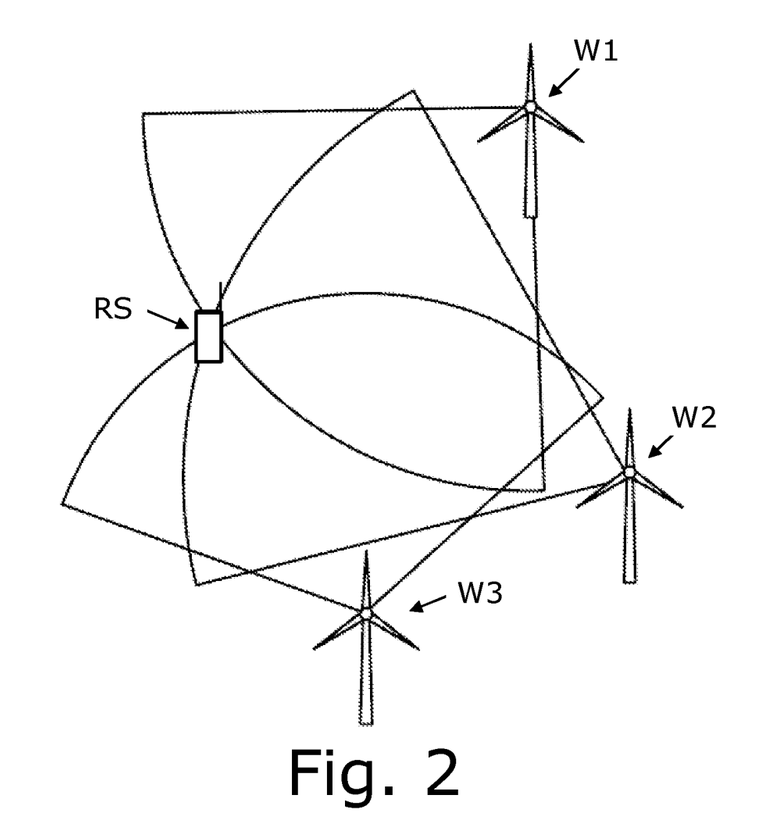
FIG. 2 shows a sketch of a multilateration of an RF source located near three wind turbines equipped with RF receivers.

FIG. 2 shows a sketch for illustrating three wind turbines W1, W2, W3 each with RF receivers, e.g. located in their nacelles, and an RF source RS, e.g. a mobile phone, transmitting RF signals. By multilateration, i.e. determining differences in time between arriving of the received RF signals from the an RF source RS at the locations of the wind turbines W1, W2, W3, it is possible to determine the location of the RF source RS.

The proposed method is not limited to any particular radio communication standard, but the primary radio source would likely be personal mobile telecommunication equipment. As such, the behavior of popular standards such as, 2G (GSM), 3G (UMTS, CDMA2000), 4G (LTE Advanced), etc. are discussed in this section. The method is preferably adapted for detecting personal mobile telecommunication communicating also according to future, not yet known, standards. E.g. this may be implemented in software, in case SDR receivers are used as RF receivers.

Mobile phones, or terminals, have a high degree of focus on energy efficiency because they are driven from a battery. As such, the standards they employ have been designed to have the terminal be passive and only transmit radio signals when necessary. The terminals would then become active during a call, during transmission of a text message, or during an active data transmission.

But even when passive, the terminals are required to communicate with the base stations in the cell phone network, so that the network is aware that the terminal is ready, and that it is connected to a given radio tower. This occurs both during movement, when a terminal switches to another tower, and periodically with what is known as location updates. Location updates are set at some fixed period, typically 1 to multiple hours. So a terminal which is on will be periodically active, even when completely idle and not in use by its user.

Modern phones, however, are rarely idle, because a large part of mobile phones today are smart phones. These phones have multiple application making use of the data connection on the network, e.g. Twitter and Facebook, and also have data based methods of communicating, e.g. push notification, voice and video calls over proprietary protocols, IP based text messages, etc. As such, modern phones are typically quite active on the network, and will transmits radio signals quite frequently.

Tracking of mobile phones is well known and there are multiple ways of doing so. Some methods require changes on the terminals, others only require changes or deployment of equipment on the base stations (mobile phone towers). Among the methods that require no changes to the terminals are TOA (time of arrival) and TDOA (time difference of arrival). The former requires knowledge of when the signal was transmitted, while the latter does not. TDOA uses the difference in arrival time to infer where the signal could have originated. It amounts to finding the intersection between hyperboloids, and it can be done by solving the following system. Let $p_1, p_2, \ldots, p_k$ be the position of k radio receivers defined by $x_k, y_k, z_k$, and e be the unknown position, $x_e, y_e, z_e$, of an emitter.

Say the time $t_n$ and $t_m$ is the time at which the signal is received in the position of the nth and mth radio receiver $p_n$ and $p_m$, respectively, and let c be the propagation speed of the radio signal, then the following equations should be solved $$d_n^2 = (ct_{ne})^2 = \|p_n - e\|^2 = (x_n - x_e)^2 + (y_n - y_e)^2 + (z_n - z_e)^2 t_{nm} =$$

$$t_n - t_m = (t_n - t_e) - (t_m - t_e) = t_{ne} - t_{me}$$

The first equation is the distance (squared) between position n and the emitter, and the second equation is the time differences ($t_{nm}$) between $t_n$ and $t_m$, being measured by the system. Isolating $t_{ne}$ in the first equation and substituting it into the second gives $$t_{nm} = \frac{1}{c}\sqrt{(x_n - x_e)^2 + (y_n - y_e)^2 + (z_n - z_e)^2} - \frac{1}{c}\sqrt{(x_m - x_e)^2 + (y_m - y_e)^2 + (z_m - z_e)^2}$$

What remains is an equation with the measurements ($t_{nm}$) of differences in arrival time between the receivers, the positions of the receivers ($p_n$) which are known, and the unknown position e if the emitter. There are many methods of solving this equation, e.g. by linearization using Taylor series expansion or by iterative methods, and there are methods more or less robust to noise.

Since the propagation speed is close to the speed of light, the measured time difference must be done very precisely. In practice, this means that the clocks between the radio receivers need to be synchronized, either by having an associated high reference clock, such as a GPS receiver, or via synchronization methods, such as NTP, PTP, or PTPv2, employing the local computer network.

In order to localize a radio signal, the signal should be separated from other signals using the same medium. The techniques used for coordinating this is known as the channel access method, and examples include separation in time (TDMA) or frequency (FDMA). The detection method should take this into account when trying to localize the signal. Depending on the standard (GSM, 3G, LTE, etc). and the channel involved in the standard, the communication may employ TDMA, CDMA, or FDMA or a combination.

The channels involved in the given telecommunications standards can be grouped into control channels and voice/traffic channels. Control channels are used e.g. for joining or leaving a base station and for initiating and terminating calls and for other types of bursty traffic such as SMS (short messaging services). The voice/traffic channels are used for communication after the setup mentioned before, and typically employ some dedicated resource (e.g. frequency) in the network Many of the existing inventions pertaining to localization in mobile telecommunications networks are based on deployment together with the base station equipment of the network, and may receive additional information, such as the decoded communication between base station and cell phone, from the network to help with localization. The method described in this invention does not have any information from the base station of the cell phone network that could assist in differentiating between incoming radio signals. As such, it requires that incoming RF signals are separated either in frequence or in time, or a combination of the two, and therefore focuses in the channels involving TDMA and/or FDMA in the given mobile telecommunications standards.

The acquisition of the signals may follow a method similar to one described e.g. in U.S. Pat. No. 5,327,144. First, for each of the given telecommunications standards and channels of interest, you would select an appropriate frame length for sampling. This frame length would be around the amount of time that communication would typically be exclusive to a single source. A minimum received power should also be selected, ie. a threshold for when the location detection algorithm is proceeded with, or the sample discarded.

Once a minimum of 3 frames have been detected for a given telecommunication standard and channel and is above the power threshold on the involved wind turbines, these frames are sent to a park operating module for processing, together with some information on frequency, standard, channel, and timing.

On the park operating module, the frames would then be cross-correlated in order to detect the differences in time of arrival. This is a well known technique and would result in a set of estimated time differences which can be used in the above TDOA equations.

Once radio sources have been localized, they should be classified in order to identify their possibly source, and whether to include them in the consideration of the noise operating mode.

Figure 3:
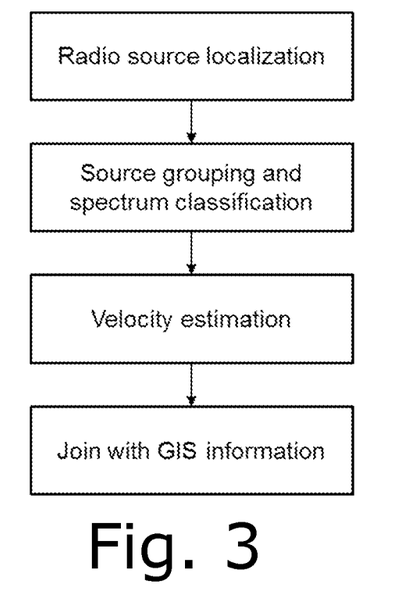
FIG. 3 shows examples of method steps for classifying detected RF sources.

FIG. 3 shows a flow diagram including possible elements to be part of a classification algorithm. The output from the radio source localization step, as described in the previous section, is a series of observations (x, y, z, t, f), i.e. coordinates, time stamps, and the base frequency of the observation. These can be grouped in order to identify which observations belong to the same radio receiver. The first step would be to identify the spectrum based on the base frequency of the observation. The observations would be assigned a signal type, e.g. mobile phone, the rationale being that a mobile phone would never send information of another type. The types would be based on spectrum regulations by relevant agencies, such as the ITU.

Once separated by frequency band, the observations would be grouped by time and location. Ie. one would select a threshold $\Delta t$ in time and distance $\Delta d$, and two observations $(x_1, y_1, z_1, t_1, f_1)$ and $(x_2, y_2, z_2, t_2, f_2)$ would then be assumed to be from the same source if $$\sqrt{(x_2-x_1)^2+(y_2-y_1)^2+(z_2-z_1)^2} < \Delta d \text{ and}$$

$$|t_2-t_1| < \Delta t$$

i.e. if they are close in space and time. Observations grouped in this fashion would then be assumed to come from the same radio source. The observations may also be grouped by their height, i.e. observations above a certain height may be assumed to be originating from machinery, such as a drone, and excluded from noise mode considerations. An additional grouping that could be done, is to group observations very close to each other (few meters) for long periods of time (several hours). These observations could be from fixed deployments of GSM/UMTS equipment, e.g. bus stops, or from the GSM/UMTS equipment in a car. Once identified these observations could be excluded from noise mode consideration.

Once grouped, the observations from mobile telephony equipment could be subject to an estimation of their velocity. This would be based on the grouping in the previous step, and you would arrange the grouped observations by time, and estimate their velocity by calculating their distance and dividing by time, resulting in a series of estimates velocities. These velocities could be further averaged, in an effort to denoise them, and to provide a more robust estimate. More advanced algorithms such as Kalman filtering could also be applied to the observations. The observations would then be classified:

0-2 m/s: walking
2-4 m/s: running
4-40 m/s: driving
>40 m/s: other, e.g. flying

Radio sources in the walking or running category could be included in consideration for the noise mode. The others could be excluded, the rationale being that if you are driving or in a helicopter, the ambient noise would exceed the noise requirements of the wind turbine.

The radio sources could be further classified by including GIS information. Examples include zoning of the area around the wind turbine park (residential, agriculture, roads, industry). Observation in certain zones, e.g. roads, could be excluded from consideration, and the zone could also be used in determining the amount of observations needed to affect the noise mode, and the weight of the effect. E.g. observations in a residential zone would be weighted higher than observations in an industrial zone. This matches the different noise regulations in certain countries, for instance in Germany.

Once observations are classified, the impact on the selected noise mode of operation is preferably assessed.

Figure 4:
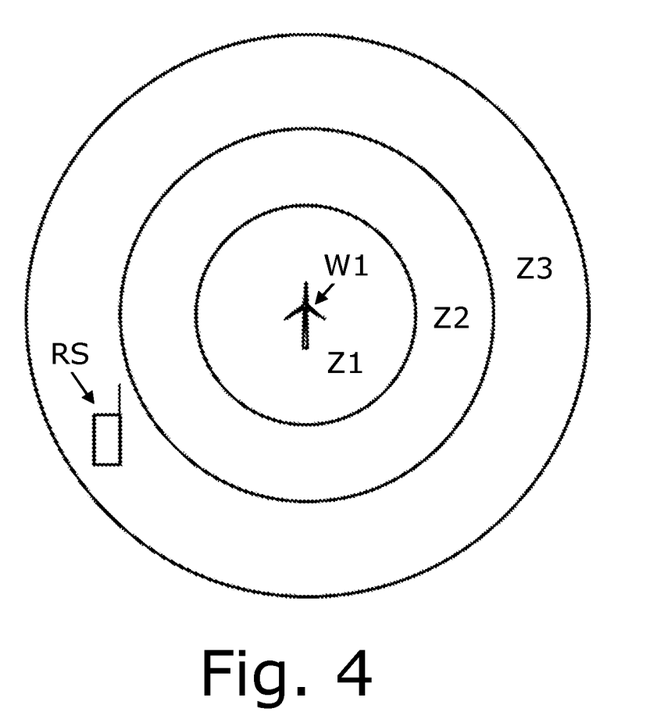
FIG. 4 shows a sketch of a wind turbine and indication of noise zones around its location.

FIG. 4 shows a wind turbine W1 where its surrounding area is grouped into noise zones Z1, Z2, Z3, i.e. zones where different levels of noise mode changes are required to maintain acceptable noise levels. In the illustration, an RF source RS is located in zone three Z3. The area of the zones Z1, Z2, Z3 could depend on the turbine type, and the particular site at which it is installed. For instance, noise may be dampened by terrain, and is also dependent on wind direction. The noise zones Z1, Z2, Z3 could either be measured as part of the planning and installation phase of the wind turbine, or they could be estimated by calculating them according to ISO 9613-2. These zones may also be wind direction dependent, and change according to the currently observed wind direction.

Once the noise zones Z1, Z2, Z3 have been established, a detected RF signal from an RF source would fall into one of the zones. Noise mode of operation could then be adjusted according to different schemes, e.g. as follows:

Dynamically: If a radio source identified as possibly coming from a person falls into a noise zone, the noise mode would be adjusted to reduce the noise sufficiently in the zone.

Daily profiles: Radio sources would be recorded for a period of time, and one would then create a daily profile with the average number of observations in a noise zone. For instance, hourly observations on weekdays, and hourly observations on weekends. A noise mode would then be picked for each hour of the day and set statically.

A combination of the above: One may also follow the daily profile method, but then allow for dynamic adjustments if enough observations are present in a noise zone.

The advantage of the dynamic method is that it is conservative with respect to noise, but it can also affect turbine operations in a way that is hard to predict. The daily profile would be more predictable, but have the risk that high noise levels can be experienced for people near the turbine at unusual hours.

Figure 5:
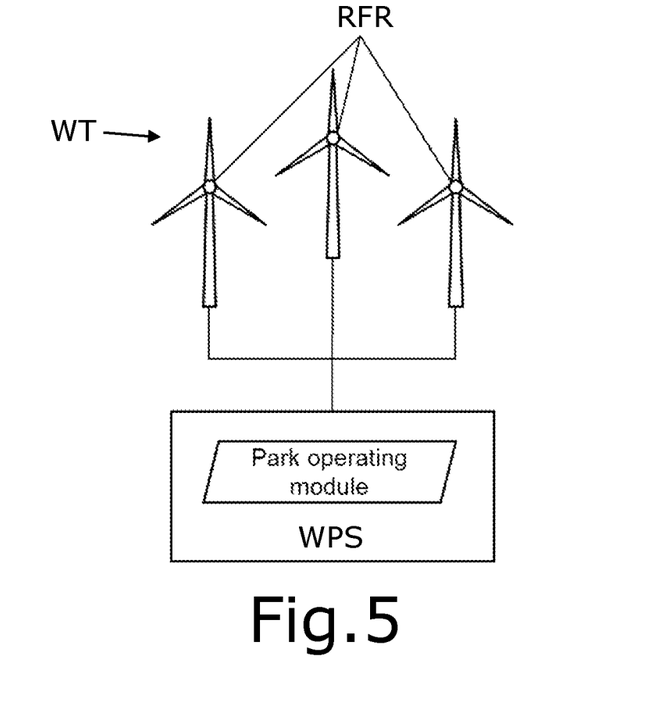
FIGS. 5 and 6 shows parts of a control system embodiment and implementation in parts of a wind turbine park.
Figure 6:
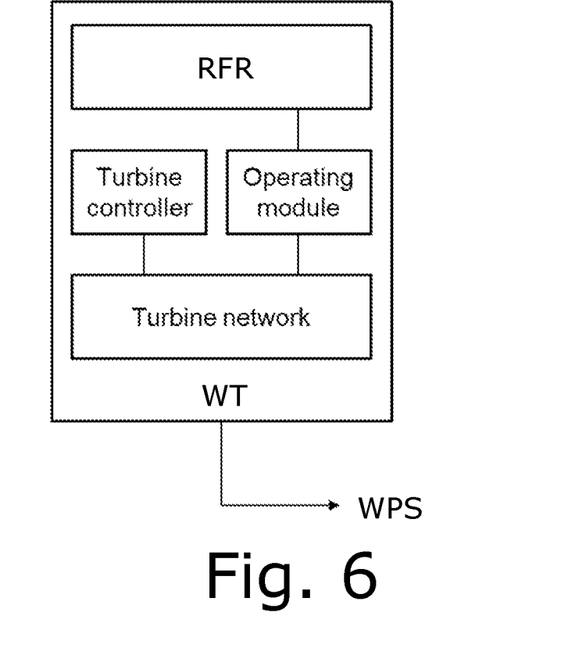

FIGS. 5 and 6 show how the control system is preferably deployed of the equipment in a wind turbine park. RF receivers RFR are installed in a subset of wind turbines WT, i.e. in at least three, but preferably in more of the wind turbines WT. A data storage and operating module, either on dedicated hardware or hardware shared with the turbine controller, for the RF receivers RFR. This would be connected to the internal network in the park. A park operating module, either dedicated hardware or software, on the central computing hardware or wind park server WPS in the park, also called the SCADA server.

During deployment, the RF receivers RFR would be precisely geolocated, e.g. with GPS/Glonass/Galileo equipment, and the position of the RF receivers RFR would be recorded and stored in the turbine operating module.

The turbine operating module could also include one of the following methods for time synchronization between the turbine operating modules:

Each operating modules would have a precise hardware reference clock, e.g. GPS/Glonass/Galileo Each operating module would synchronize their time over the park network via NTP, PTP, PTPv2, or other similar methods.

A combination of the above, e.g. 1 hardware reference clock deployed and PTPv2 synchronization on the other operating modules.

The park operating module could include the overall configuration of the system, and coordinate the operation of the system.

The signal would be received by multiple RF receivers RFR and be subject to a received strength threshold. If the signal is of sufficient strength, a sample of a certain time length would be stored in the turbine operating modules.

The turbine operating modules would then send the sample to the park operating module including a reference time of the beginning of the sample, and the turbine operating module that it originated from.

The park operating modules would then have a multiple of samples with similar frequency bands and would then cross-correlate the samples to find the precise time difference between them. This information would then be used, see above sections, to find the origin of the sample.

The sample would then be subject to the classification workflow, see above sections, and a decision to affect the operating modes of the turbines would be performed.

This information would then be delegated, either directly to the wind turbine controller or through the wind park server WPS, to change the operating modes of the turbines.

Figure 7:
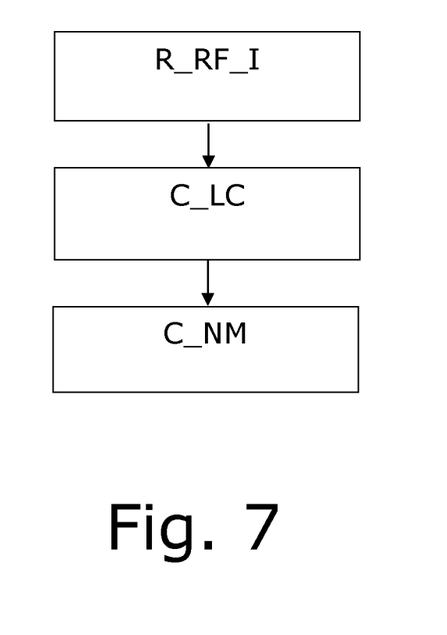
FIG. 7 shows steps of a method embodiment.

FIG. 7 shows steps of a method embodiment for controlling a noise mode of operation of a wind turbine in a wind turbine park. First, receiving inputs R_RF_I from a plurality of RF receivers located at positions in respective wind turbines in the wind turbine park. Next, calculating C_LC a measure indicative of a location of an RF source which transmits an RF signal power exceeding a preset minimum threshold. This is preferably done using a multilateration algorithm executed in response to the inputs from the plurality of RF receivers and based on known positions of these RF receivers. Finally, controlling C_NM the noise mode of operation of one or more wind turbines in the wind turbine park according to the measure indicative of a location of the RF source.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A control system for controlling a noise mode of operation of a wind turbine in a wind turbine park, the control system comprising a processor programmed to:
   receive inputs from a plurality of radio frequency receivers located at positions in or near respective wind turbines in the wind turbine park;
   calculate a measure indicative of a location of a radio frequency source near a wind turbine of the wind turbine park based on the inputs from the plurality of radio frequency receivers;
   determine a velocity of the radio frequency source; and
   control the noise mode of operation of the wind turbine in the wind turbine park based on the measure in response to determining that the velocity is below a first threshold velocity and above a second threshold velocity.

2. The control system according to claim 1, wherein the processor is further programmed to calculate a measure indicative of a location of a plurality of single radio frequency sources within a predefined area around at least one wind turbine of the wind turbine park in response to the inputs from the plurality of radio frequency receivers.

3. The control system according to claim 1, wherein the processor is further programmed to determine the location of the radio frequency source by performing a multilateration calculation in response to inputs from at least three radio frequency receivers.

4. The control system according to claim 1, wherein the processor is further programmed to perform a source classification of a single radio frequency source.

5. The control system according to claim 1, wherein the processor is further programmed to individually control the noise mode of operation of a plurality of wind turbines in the wind turbine park in response to the measure indicative of the location of the radio frequency source.

6. The control system according to claim 1, wherein the noise mode of operation of the wind turbine is controlled by selecting between a number of predefined noise modes of operation in response to the measure indicative of the location of the radio frequency source.

7. The control system according to claim 1, wherein controlling the noise mode of operation of the wind turbine comprises controlling at least blade pitch.

8. The control system according to claim 1, wherein calculating the measure indicative of the location of the radio frequency source is performed within a limited, predefined radio frequency band comprising at least one of: the GSM band, the UMTS, the DCMA2000 band, and the LTE band.

9. The control system according to claim 1, implemented at least partly on a wind park server arranged to control the wind turbine park, wherein said wind park server is connected to at least three radio frequency receivers via a wired or wireless network, so as to allow time synchronization of a radio frequency signal received from one source location via the at least three radio frequency receivers.

10. The control system according to claim 1, wherein the processor is further programmed to continuously update the measure indicative of the location of the radio frequency source, and adjust the noise mode of operation of the wind turbine of the wind turbine park accordingly.

11. The control system according to claim 1, wherein the processor is further programmed to:
   receive inputs from the plurality of radio frequency receivers;
   calculate measures indicative of locations of radio frequency sources over a period of time;
   calculate a statistical measure in response to the measures indicative of locations of radio frequency sources over a period of time; and
   control the noise mode of operation of the wind turbine in the wind turbine park according to the statistical measure.

12. The control system according to claim 11, wherein the processor is further programmed to:
   calculate the statistical measure over a period of a plurality of days;
   determine different first and second noise modes of operation accordingly; and
   control the noise modes of operation of the wind turbine of the wind turbine park in response to day time and night time noise modes of operation.

13. The control system of claim 1, wherein the processor is further configured to:

calculate a second measure indicative of a second location of a second radio frequency source near the wind turbine based on the inputs from the plurality of radio frequency receivers; and determine a second velocity of the second radio frequency source, wherein controlling the noise mode is not based on the second measure in response to determining that the second velocity is fixed for a time exceeding a time threshold.

14. The control system of claim 1, wherein the processor is further configured to:

calculate a second measure indicative of a second location of a second radio frequency source near the wind turbine based on the inputs from the plurality of radio frequency receivers; and determine a second velocity of the second radio frequency source, wherein controlling the noise mode is not based on the second measure in response to determining that the second velocity exceeds a third velocity threshold.

15. A wind turbine park comprising:
at least one wind turbine;
a plurality of radio frequency receivers; and
a control system configured to:
calculate a measure indicative of a location of a radio frequency source near the at least one wind turbine based on inputs from the plurality of radio frequency receivers;
determine a velocity of the radio frequency source; and
control a noise mode of operation of the at least one wind turbine based on the measure in response to determining that the velocity is below a first threshold velocity and above a second threshold velocity.

16. A method for controlling a noise mode of operation of a wind turbine in a wind turbine park, the method comprising:

receiving inputs from a plurality of radio frequency receivers located at positions in or near respective wind turbines in the wind turbine park;

calculating a measure indicative of a location of a radio frequency source near a wind turbine of the wind turbine park based on the inputs from the plurality of radio frequency receivers;

determining a velocity of the radio frequency source; and controlling the noise mode of operation of the wind turbine in the wind turbine park based on the measure in response to determining that the velocity is below a first threshold velocity and above a second threshold velocity.

* * * * *